US012565758B2

(12) United States Patent
Yamamoto

(10) Patent No.: US 12,565,758 B2
(45) Date of Patent: Mar. 3, 2026

(54) SHOVEL

(71) Applicant: SUMITOMO CONSTRUCTION MACHINERY CO., LTD., Tokyo (JP)

(72) Inventor: Takashi Yamamoto, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 91 days.

(21) Appl. No.: 18/639,521

(22) Filed: Apr. 18, 2024

(65) Prior Publication Data

US 2024/0287764 A1 Aug. 29, 2024

Related U.S. Application Data

(63) Continuation of application No. PCT/JP2022/040196, filed on Oct. 27, 2022.

(30) Foreign Application Priority Data

Oct. 29, 2021 (JP) ................................ 2021-178369

(51) Int. Cl.
*E02F 9/22* (2006.01)
*F15B 11/16* (2006.01)

(52) U.S. Cl.
CPC ............ *E02F 9/2221* (2013.01); *F15B 11/16* (2013.01)

(58) Field of Classification Search
CPC ............................... E02F 9/2221; F15B 11/16
(Continued)

(56) References Cited

U.S. PATENT DOCUMENTS

2002/0019295 A1* 2/2002 Kobayashi .............. F16H 63/46 477/174
2011/0238264 A1 9/2011 Wu
(Continued)

FOREIGN PATENT DOCUMENTS

JP H04-019406 1/1992
JP H10-061605 3/1998
(Continued)

OTHER PUBLICATIONS

Chen, Jianneng et al. "Design and Experimental Study of a Power Matching Control System for a Working Device of a Tree Transplanting Machine." Proceedings of the Institution of Mechanical Engineers. Part I, Journal of systems and control engineering 233.6 (2019): 689-701. Web. (Year: 2019).*
(Continued)

*Primary Examiner* — Matthias S Weisfeld
*Assistant Examiner* — Keith A von Volkenburg
(74) *Attorney, Agent, or Firm* — IPUSA, PLLC

(57) ABSTRACT

A shovel includes a lower traveling body, an upper swing body swingably mounted on the lower traveling body, a motor mounted on the upper swing body, a hydraulic pump driven by the motor, and processing circuitry configured to control the discharge flow rate of the hydraulic pump in accordance with a flow rate control characteristic that is preset. The flow rate control characteristic is a characteristic indicating a correspondence between the displacement of the hydraulic pump and a negative control pressure. The flow rate control characteristic includes a first flow rate control characteristic adopted when the motor rotates at a first rotational speed and a second flow rate control characteristic adopted when the motor rotates at a second rotational speed lower than the first rotational speed.

14 Claims, 5 Drawing Sheets

(58) Field of Classification Search
USPC .......................................................... 701/50
See application file for complete search history.

(56) References Cited

U.S. PATENT DOCUMENTS

| | | | | |
|---|---|---|---|---|
| 2012/0312007 | A1* | 12/2012 | Kawasaki | E02F 9/2235 60/459 |
| 2015/0204359 | A1* | 7/2015 | Wu | F15B 15/08 60/428 |
| 2016/0312443 | A1* | 10/2016 | Egawa | E02F 9/2217 |
| 2018/0238027 | A1* | 8/2018 | Kishida | E02F 9/2235 |
| 2020/0291610 | A1* | 9/2020 | Misaki | F15B 11/16 |
| 2021/0262196 | A1* | 8/2021 | Ito | E02F 9/205 |
| 2021/0404141 | A1 | 12/2021 | Sano et al. | |
| 2022/0002965 | A1* | 1/2022 | Misaki | E02F 9/264 |
| 2022/0002975 | A1* | 1/2022 | Sano | E02F 9/2282 |
| 2022/0154429 | A1* | 5/2022 | Nishikawara | F15B 11/0423 |

FOREIGN PATENT DOCUMENTS

| | | | | |
|---|---|---|---|---|
| JP | 2000-309952 | | 11/2000 | |
| JP | 4843105 | | 12/2011 | |
| JP | 2012087914 | A * | 5/2012 | |
| JP | 520806 | B2 * | 6/2013 | |
| JP | 2017166604 | A * | 9/2017 | E02F 9/2221 |
| JP | 2020007839 | A * | 1/2020 | E02F 9/20 |
| JP | 2020076474 | A * | 5/2020 | |
| WO | WO-2019022001 | A1 * | 1/2019 | F15B 11/00 |
| WO | 2020/184606 | | 9/2020 | |
| WO | 2021/029399 | | 2/2021 | |

OTHER PUBLICATIONS

Arai, Ryo et al. "Analytical, Experimental, and Numerical Investigation of Energy in Hydraulic Cylinder Dynamics of Agriculture Scale Excavators." Energies (Basel) 14.19 (2021): 6210. Web. (Year: 2021).*

International Search Report for PCT/JP2022/040196 mailed on Dec. 13, 2022.

* cited by examiner

SHOVEL

CROSS-REFERENCE TO RELATED APPLICATIONS

This application is a continuation application filed under 35 U.S.C. 111 (a) claiming benefit under 35 U.S.C. 120 and 365 (c) of PCT International Application No. PCT/JP2022/040196, filed on Oct. 27, 2022 and designating the U.S., which claims priority to Japanese Patent Application No. 2021-178369, filed on Oct. 29, 2021. The entire contents of the foregoing applications are incorporated herein by reference.

BACKGROUND

Technical Field

The present disclosure relates to shovels.

Description of Related Art

A conventional shovel equipped with a negative control type hydraulic system is known. In the negative control type hydraulic system, of the hydraulic oil discharged by a hydraulic pump, hydraulic oil that does not flow into hydraulic actuators for actuating parts of the shovel is discharged to a hydraulic oil tank through a throttle placed in a center bypass oil passage. Displacement of the hydraulic pump is controlled in accordance with control pressure which is hydraulic oil pressure upstream of the throttle. This control pressure is also referred to as negative control pressure, and increases as the flow rate of the hydraulic oil passing through the throttle increases. The displacement of the hydraulic pump is the amount of hydraulic oil discharged from the hydraulic pump per revolution of the hydraulic pump. When the hydraulic actuator is operated, the flow rate of hydraulic oil flowing into the hydraulic actuator increases, and therefore, the flow rate of hydraulic oil passing through the throttle decreases, and the control pressure decreases. Therefore, the hydraulic pump is controlled such that the displacement increases as the control pressure decreases. This is to allow a sufficient amount of hydraulic oil to flow into a hydraulic actuator while the hydraulic actuator is operated. On the other hand, the hydraulic pump is controlled such that the displacement decreases as the control pressure increases. This is to prevent hydraulic oil from being wastefully discharged when the hydraulic actuator is not operated.

SUMMARY

According to an aspect, a shovel includes a lower traveling body, an upper swing body swingably mounted on the lower traveling body, a motor mounted on the upper swing body, a hydraulic pump driven by the motor, and processing circuitry configured to control the discharge flow rate of the hydraulic pump in accordance with a flow rate control characteristic that is preset. The flow rate control characteristic is a characteristic indicating a correspondence between the displacement of the hydraulic pump and a negative control pressure. The flow rate control characteristic includes a first flow rate control characteristic adopted when the motor rotates at a first rotational speed and a second flow rate control characteristic adopted when the motor rotates at a second rotational speed lower than the first rotational speed.

DETAILED DESCRIPTION

According to the negative control type hydraulic system as described above, a line chart representing a correspondence between the displacement of the hydraulic pump and the control pressure (flow rate control characteristic line) is fixedly set on the assumption that the rotational speed of an engine as a motor is a predetermined rotational speed such as a rated rotational speed. Therefore, when there is a change in the operating state of the motor, such as a change in the rotational speed of the engine that has rotated at a predetermined rotational speed, the discharge flow rate of the hydraulic pump decreases, and the operability of the shovel may deteriorate. The discharge flow rate of the hydraulic pump is, for example, the flow rate of hydraulic oil discharged from the hydraulic pump per minute, and is calculated by, for example, multiplying the rotational speed of the engine by the displacement.

Thus, it is desirable to provide a shovel capable of suppressing or preventing the deterioration of the operability of the shovel even when the operating state of a motor changes.

According to an embodiment, a shovel capable of suppressing or preventing the deterioration of the operability of the shovel even when the operating state of a motor changes is provided.

Figure 1:
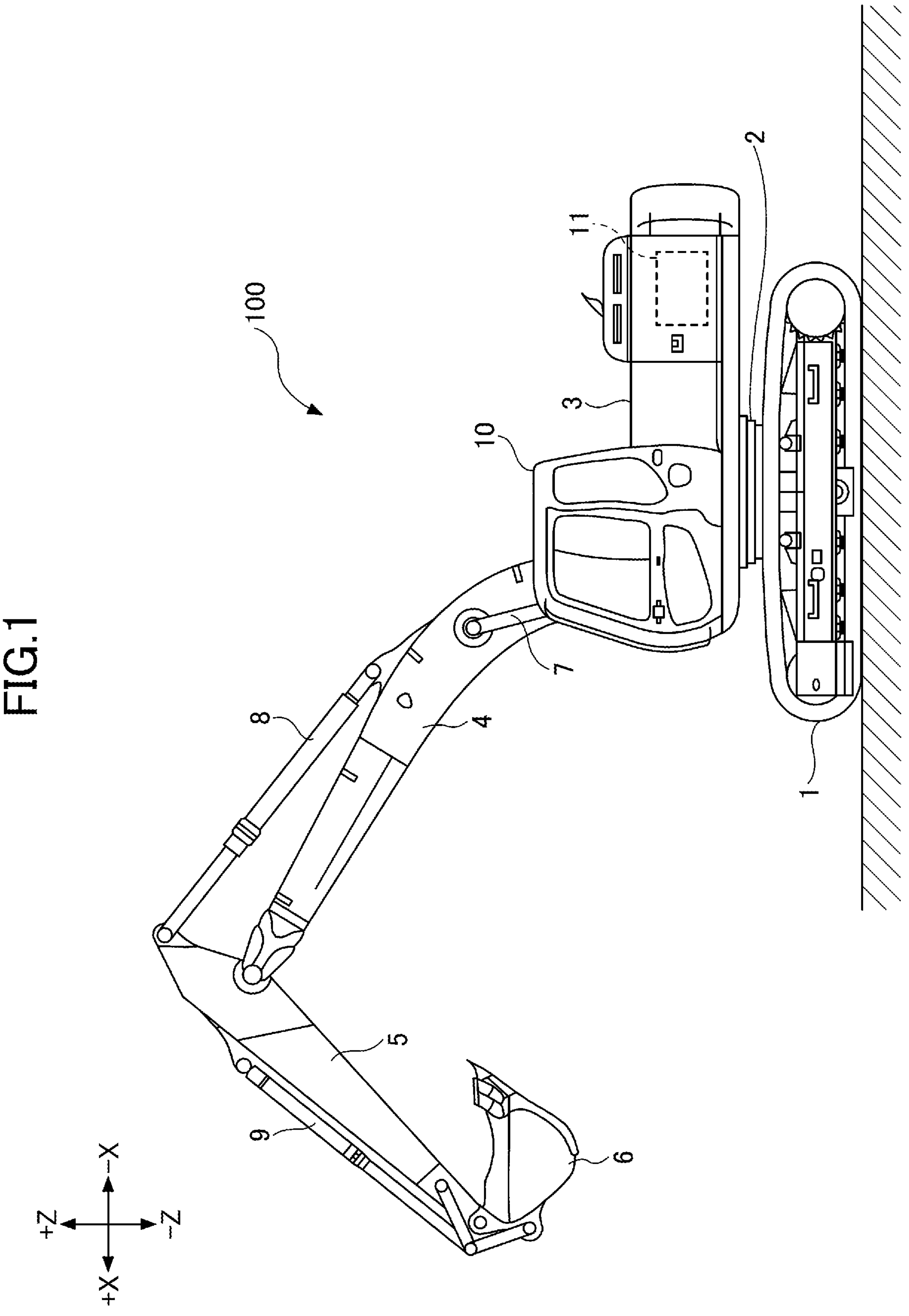
FIG. 1 is a side view of a shovel according to an embodiment of the present invention.

An excavator (shovel 100) as a construction machine according to an embodiment of the present invention is described with reference to FIG. 1. FIG. 1 is a side view of the shovel 100. An upper swing body 3 is swingably mounted on a lower traveling body 1 of the shovel 100 illustrated in FIG. 1 via a swing mechanism 2. A boom 4 serving as a working element is attached to the upper swing body 3. An arm 5 serving as a working element is attached to the distal end of the boom 4, and a bucket 6 serving as a working element and an end attachment is attached to the distal end of the arm 5. The boom 4, the arm 5, and the bucket 6 constitute an excavation attachment which is an example of an attachment. The boom 4 is driven by a boom cylinder 7, the arm 5 is driven by an arm cylinder 8, and the bucket 6 is driven by a bucket cylinder 9. A cabin 10 is provided and a power source such as an engine 11 is mounted on the upper swing body 3.

Figure 2:
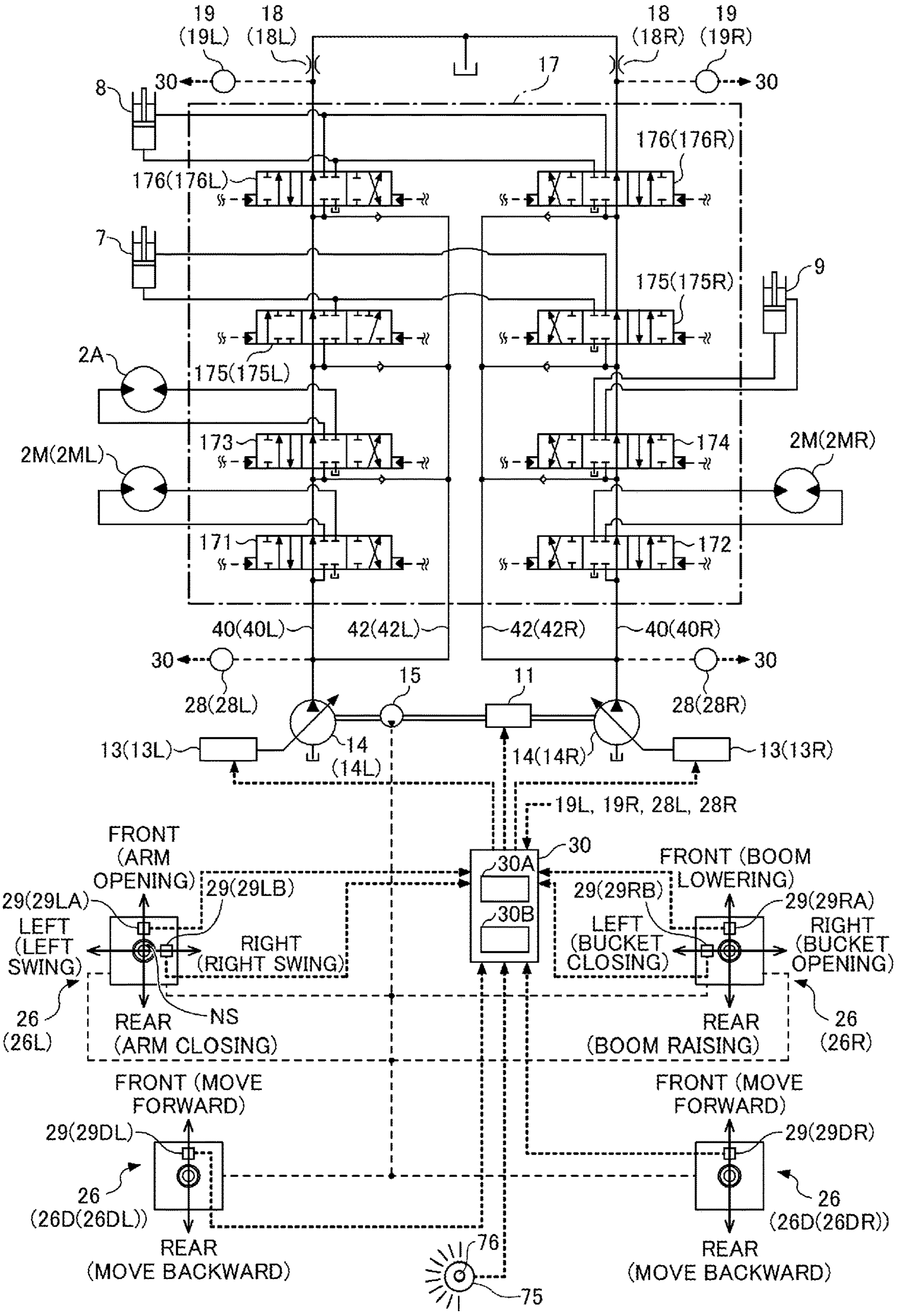
FIG. 2 is a diagram illustrating an example configuration of a hydraulic system installed in the shovel of FIG. 1.

Next, an example configuration of a hydraulic system installed in the shovel 100 is described with reference to FIG. 2. FIG. 2 is a diagram illustrating an example configuration of a hydraulic system installed in the shovel 100. In FIG. 2, a mechanical power transmission system, a hydraulic oil line, a pilot line, and an electrical control system are indicated by a double line, a solid line, a dashed line, and a dotted line, respectively.

The hydraulic system of the shovel 100 mainly includes the engine 11, a pump regulator 13, a main pump 14, a pilot pump 15, a control valve unit 17, an operating device 26, a discharge pressure sensor 28, an operating pressure sensor 29, a controller 30, a dial 75, an ECO button 76, and the like.

In FIG. 2, the hydraulic system is configured to be able to circulate hydraulic oil from the main pump 14 driven by the engine 11, which is an example of a motor, to a hydraulic oil tank via a center bypass oil passage 40 or a parallel oil passage 42.

The engine 11, which is an example of a motor, is a drive source of the shovel 100. The motor is an electric motor connected to a fuel cell, a battery, or the like, a gasoline engine, a hydrogen engine, a diesel engine, or the like. According to this embodiment, the engine 11 is, for example, a diesel engine that operates to maintain a predetermined rotational speed. The output shaft of the engine 11 is connected to the respective input shafts of the main pump 14 and the pilot pump 15.

The main pump 14 is configured to be able to supply the hydraulic oil to the control valve unit 17 via the hydraulic oil line. According to this embodiment, the main pump 14 is a swash plate variable displacement hydraulic pump, and includes a left main pump 14L and a right main pump 14R. The main pump 14 is an electrically controlled hydraulic pump.

The pump regulator 13 is configured to be able to control the discharge flow rate of the main pump 14. According to this embodiment, the pump regulator 13 controls the discharge flow rate of the main pump 14 by adjusting the tilt angle of the swash plate of the main pump 14 according to a control command from the controller 30. The pump regulator 13 includes a left pump regulator 13L and a right pump regulator 13R.

Specifically, the pump regulator 13 controls the displacement of the main pump 14 in response to a control command from the controller 30, thereby controlling the discharge flow rate of the main pump 14. The displacement of the main pump 14 is the amount of hydraulic oil discharged from the main pump 14 per revolution of the main pump 14. The discharge flow rate of the main pump 14 is the flow rate of hydraulic oil discharged from the main pump 14 per minute. Specifically, the left pump regulator 13L controls the discharge flow rate of the left main pump 14L by controlling the displacement of the left main pump 14L according to a control command from the controller 30. Similarly, the right pump regulator 13R controls the discharge flow rate of the right main pump 14R by controlling the displacement of the right main pump 14R according to a control command from the controller 30.

The pilot pump 15 is configured to be able to supply the hydraulic oil to hydraulic control devices including the operating device 26 via the pilot line. According to this embodiment, the pilot pump 15 is a fixed displacement hydraulic pump. The pilot pump 15 may be omitted. In such a case, the function of the pilot pump 15 may be implemented by the main pump 14. That is, the main pump 14 may have a function of supplying the hydraulic oil to the operating device 26, etc., after the pressure of the hydraulic oil is reduced by a throttle or the like, apart from the function of supplying the hydraulic oil to the control valve unit 17.

The control valve unit 17 is a hydraulic controller that controls the hydraulic system in the shovel 100. According to this embodiment, the control valve unit 17 includes control valves 171 to 176 that function as directional control valves. The control valve 175 includes a control valve 175L and a control valve 175R, and the control valve 176 includes a control valve 176L and a control valve 176R. The control valve unit 17 is configured to be able to selectively supply the hydraulic oil discharged by the main pump 14 to one or more hydraulic actuators through the control valves 171 to 176. The control valves 171 to 176 control, for example, the flow rate of hydraulic oil flowing from the main pump 14 to hydraulic actuators and the flow rate of hydraulic oil flowing from hydraulic actuators to the hydraulic oil tank. According to the example illustrated in FIG. 2, the hydraulic actuators include the boom cylinder 7, the arm cylinder 8, the bucket cylinder 9, a traveling hydraulic motor 2M (a left travel hydraulic motor 2ML and a right travel hydraulic motor 2MR), and a swing hydraulic motor 2A.

The operating device 26 is a device used by an operator to operate actuators. The actuators include at least one of a hydraulic actuator or an electric actuator. According to this embodiment, the operating device 26 is configured to be able to supply hydraulic oil discharged by the pilot pump 15 to a pilot port of a corresponding control valve in the control valve unit 17 via the pilot line. The pressure (pilot pressure) of the hydraulic oil supplied to each pilot port is a pressure corresponding to the direction of operation and the amount of operation of the operating device 26 corresponding to a hydraulic actuator. The operating device 26, however, may be of an electromagnetic pilot type instead of the hydraulic pilot type as described above. Alternatively, a control valve in the control valve unit 17 may be an electromagnetic solenoid type spool valve.

The discharge pressure sensor 28 is configured to be able to detect the discharge pressure of the main pump 14. According to this embodiment, the discharge pressure sensor 28 outputs a detected value to the controller 30. Specifically, the discharge pressure sensor 28 includes a left discharge pressure sensor 28L and a right discharge pressure sensor 28R. The left discharge pressure sensor 28L detects the discharge pressure of the left main pump 14L to output a detected value to the controller 30. The same applies to the right discharge pressure sensor 28R.

The operating pressure sensor 29 is configured to be able to detect the details of the operator's operation of the operating device 26. According to this embodiment, the operating pressure sensor 29 detects a pressure (operating pressure) corresponding to the direction of operation and the amount of operation of the operating device 26 for each actuator to output a detected value to the controller 30. The details of the operation of the operating device 26 may be detected using a sensor or a device other than the operating pressure sensor, such as a potentiometer.

The left main pump 14L circulates the hydraulic oil to the hydraulic oil tank via a left center bypass oil passage 40L or a left parallel oil passage 42L, and the right main pump 14R circulates the hydraulic oil to the hydraulic oil tank via a right center bypass oil passage 40R or a right parallel oil passage 42R.

The left center bypass oil passage 40L is a hydraulic oil line passing through the control valves 171 and 173, 175L, and 176L arranged in the control valve unit 17. The right center bypass oil passage 40R is a hydraulic oil line passing through the control valves 172, 174, 175R, and 176R arranged in the control valve unit 17.

The control valve 171 is a spool valve that switches the flow of the hydraulic oil in order to supply the hydraulic oil discharged by the left main pump 14L to the left travel hydraulic motor 2ML and to discharge the hydraulic oil discharged by the left travel hydraulic motor 2ML to the hydraulic oil tank.

The control valve 172 is a spool valve that switches the flow of the hydraulic oil in order to supply the hydraulic oil discharged by the right main pump 14R to the right travel hydraulic motor 2MR and to discharge the hydraulic oil discharged by the right travel hydraulic motor 2MR to the hydraulic oil tank.

The control valve 173 is a spool valve that switches the flow of the hydraulic oil in order to supply the hydraulic oil discharged by the left main pump 14L to the swing hydraulic motor 2A and to discharge the hydraulic oil discharged by the swing hydraulic motor 2A to the hydraulic oil tank.

The control valve 174 is a spool valve that switches the flow of the hydraulic oil in order to supply the hydraulic oil discharged by the right main pump 14R to the bucket cylinder 9 and to discharge the hydraulic oil in the bucket cylinder 9 to the hydraulic oil tank.

The control valve 175L is a spool valve that switches the flow of the hydraulic oil in order to supply the hydraulic oil discharged by the left main pump 14L to the boom cylinder 7. The control valve 175R is a spool valve that switches the flow of the hydraulic oil in order to supply the hydraulic oil discharged by the right main pump 14R to the boom cylinder 7 and to discharge the hydraulic oil in the boom cylinder 7 to the hydraulic oil tank.

The control valve 176L is a spool valve that switches the flow of the hydraulic oil to supply the hydraulic oil discharged by the left main pump 14L to the arm cylinder 8 and to discharge the hydraulic oil in the arm cylinder 8 to the hydraulic oil tank. The control valve 176R is a spool valve that switches the flow of the hydraulic oil to supply the hydraulic oil discharged by the right main pump 14R to the arm cylinder 8 and to discharge the hydraulic oil in the arm cylinder 8 to the hydraulic oil tank.

The left parallel oil passage 42L is a hydraulic oil line parallel to the left center bypass oil passage 40L. In a case where the flow of the hydraulic oil passing through the left center bypass oil passage 40L is restricted or blocked by any of the control valves 171, 173, and 175L, the left parallel oil passage 42L can supply the hydraulic oil to the further downstream control valve than these control valves. The right parallel oil passage 42R is a hydraulic oil line parallel to the right center bypass oil passage 40R. In a case where the flow of the hydraulic oil passing through the right center bypass oil passage 40R is restricted or blocked by any of the control valves 172, 174, and 175R, the right parallel oil passage 42R can supply the hydraulic oil to the further downstream control valves than these control valves.

The left pump regulator 13L adjusts the tilt angle of the swash plate of the left main pump 14L in accordance with the discharge pressure of the left main pump 14L, thereby controlling the discharge flow rate of the left main pump 14L. Specifically, the left pump regulator 13L adjusts the tilt angle of the swash plate of the left main pump 14L in accordance with an increase in the discharge pressure of the left main pump 14L to reduce the discharge amount, for example. The same applies to the right pump regulator 13R. This is because the absorbed power (for example, absorbed horsepower) of the main pump 14, which is represented by the product of the discharge pressure and the discharge amount, is prevented from exceeding the output power (for example, output horsepower) of the engine 11.

The operation device 26 includes a left operating lever 26L, a right operating lever 26R, and a traveling lever 26D as operating levers. The traveling lever 26D includes a left traveling lever 26DL and a right traveling lever 26DR.

The left operating lever 26L is used for a swing operation and an operation of the arm 5. When the left operating lever 26L is operated in the front-rear direction, the left operating lever 26L applies pressure (pilot pressure) corresponding to the amount of lever operation to a pilot port of the control valve 176 using the hydraulic oil discharged by the pilot pump 15. When the left operating lever 26L is operated in the left-right direction, the left operating lever 26L applies pressure (pilot pressure) corresponding to the amount of lever operation to a pilot port of the control valve 173 using the hydraulic oil discharged by the pilot pump 15.

Specifically, the left operating lever 26L is operated in the arm closing direction to cause the hydraulic oil to flow into the right pilot port of the control valve 176L and cause the hydraulic oil to flow into the left pilot port of the control valve 176R. The left operating lever 26L is operated in the arm opening direction to cause the hydraulic oil to flow into the left pilot port of the control valve 176L and cause the hydraulic oil to flow into the right pilot port of the control valve 176R. Furthermore, the left operating lever 26L is operated in the counterclockwise swing direction to cause the hydraulic oil to flow into the left pilot port of the control valve 173, and the left operating lever 26L is operated in the clockwise swing direction to cause the hydraulic oil to flow into the right pilot port of the control valve 173.

The right operating lever 26R is used for operation of the boom 4 and operation of the bucket 6. The right operating lever 26R is operated in the front-rear direction to apply a pressure (pilot pressure) corresponding to the amount of lever operation to a pilot port of the control valve 175 using the hydraulic oil discharged by the pilot pump 15. The right operating lever 26R is operated in the left-right direction to apply a pressure (pilot pressure) corresponding to the amount of lever operation to a pilot port of the control valve 174 using the hydraulic oil discharged by the pilot pump 15.

Specifically, the right operating lever 26R is operated in the boom lowering direction to cause the hydraulic oil to flow into the left pilot port of the control valve 175R. The right operating lever 26R is operated in the boom raising direction to cause the hydraulic oil to flow into the right pilot port of the control valve 175L and cause the hydraulic oil to flow into the left pilot port of the control valve 175R. Furthermore, the right operating lever 26R is operated in the bucket closing direction to cause the hydraulic oil to flow into the right pilot port of the control valve 174, and the right operating lever 26R is operated in the bucket opening direction to cause the hydraulic oil to flow into the left pilot port of the control valve 174.

The traveling lever 26D is used for operating a crawler 1C including a left crawler and a right crawler. Specifically, the left traveling lever 26DL is used for operating the left crawler. The left traveling lever 26DL may be configured to be interlocked with a left traveling pedal (not illustrated). The left traveling lever 26DL is operated in the front-rear direction to apply a pressure (pilot pressure) corresponding to the amount of lever operation to a pilot port of the control valve 171 using the hydraulic oil discharged by the pilot pump 15. The right traveling lever 26DR is used for operating the right crawler. The right traveling lever 26DR may be configured to be interlocked with a right traveling pedal (not illustrated). The right traveling lever 26DR is operated in the front-rear direction to apply a pressure (pilot pressure) corresponding to the amount of lever operation to a pilot port of the control valve 172 using the hydraulic oil discharged by the pilot pump 15.

The operating pressure sensor 29 includes operating pressure sensors 29LA, 29LB, 29RA, 29RB, 29DL, and 29DR. The operating pressure sensor 29LA detects pressure corresponding to the details of the operator's operation of the left operating lever 26L in the front-rear direction to output a detected value to the controller 30. The operation details are, for example, the direction of lever operation, the amount of lever operation (the angle of lever operation), and the like.

Similarly, the operating pressure sensor 29LB detects a pressure corresponding to the details of the operator's operation of the left operating lever 26L in the left-right direction to output a detected value to the controller 30. The operating pressure sensor 29RA detects a pressure corresponding to the details of the operator's operation of the right operating lever 26R in the front-rear direction to output a detected value to the controller 30. The operating pressure sensor 29RB detects a pressure corresponding to the details of the operator's operation of the right operating lever 26R in the left-right direction to output a detected value to the controller 30. The operating pressure sensor 29DL detects a pressure corresponding to the details of the operator's operation of the left traveling lever 26DL in the front-rear direction to output a detected value to the controller 30. The operating pressure sensor 29DR detects a pressure corresponding to the details of the operator's operation of the right traveling lever 26DR in the front-rear direction to output a detected value to the controller 30.

The controller 30 is an example of processing circuitry and functions as a control device for controlling the shovel 100. In this embodiment, the controller 30 is constituted of a computer including a central processing unit (CPU), a volatile storage unit, a nonvolatile storage unit, and the like. For example, the controller 30 receives the output of the operation pressure sensor 29 and outputs a control command to the pump regulator 13 to change the discharge flow rate of the main pump 14 as needed. The controller 30 also receives the output of a control pressure sensor 19 provided upstream of a throttle 18 and outputs a control command to the pump regulator 13 to change the discharge flow rate of the main pump 14 as needed. The throttle 18 includes a left throttle 18L and a right throttle 18R, and the control pressure sensor 19 includes a left control pressure sensor 19L and a right control pressure sensor 19R.

In the left center bypass oil passage 40L, the left throttle 18L is disposed between the furthest downstream control valve 176L and the hydraulic oil tank. Thus, the flow of the hydraulic oil discharged by the left main pump 14L is restricted by the left throttle 18L. The left throttle 18L generates a control pressure (negative control pressure) for controlling the left pump regulator 13L. The left control pressure sensor 19L is a sensor for detecting the control pressure, and outputs a detected value to the controller 30. In accordance with the control pressure, the controller 30 adjusts the tilt angle of the swash plate of the left main pump 14L to control the discharge flow rate of the left main pump 14L. The controller 30 reduces the discharge flow rate of the left main pump 14L as the control pressure increases, and increases the discharge flow rate of the left main pump 14L as the control pressure decreases. The discharge flow rate of the right main pump 14R is also controlled in the same manner. Specifically, in the right center bypass oil passage 40R, the right throttle 18R is disposed between the furthest downstream control valve 176R and the hydraulic oil tank. Thus, the flow of the hydraulic oil discharged by the right main pump 14R is restricted by the right throttle 18R. The right throttle 18R generates a control pressure (negative control pressure) for controlling the right pump regulator 13R. The right control pressure sensor 19R is a sensor for detecting the control pressure, and outputs a detected value to the controller 30. In accordance with the control pressure, the controller 30 adjusts the tilt angle of the swash plate of the right main pump 14R to control the discharge flow rate of the right main pump 14R. The controller 30 reduces the discharge flow rate of the right main pump 14R as the control pressure increases, and increases the discharge flow rate of the right main pump 14R as the control pressure decreases. This control method is also referred to as "negative control method".

Specifically, in the case of a standby state in which none of the hydraulic actuators in the shovel 100 is operated as illustrated in FIG. 2, the hydraulic oil discharged by the left main pump 14L reaches the left throttle 18L through the left center bypass oil passage 40L. The flow of the hydraulic oil discharged by the left main pump 14L increases the control pressure (negative control pressure) generated upstream of the left throttle 18L. As a result, the controller 30 reduces the discharge flow rate of the left main pump 14L to the minimum allowable discharge flow rate, and suppresses pumping loss when the discharged hydraulic oil passes through the left center bypass oil passage 40L. In contrast, in a case where any one of the hydraulic actuators is operated, the hydraulic oil discharged by the left main pump 14L flows into the operate hydraulic actuator via the control valve corresponding to the operate hydraulic actuator. The flow of the hydraulic oil discharged by the left main pump 14L reduces or eliminates the amount of hydraulic oil reaching the left throttle 18L, and reduces the control pressure (negative control pressure) generated upstream of the left throttle 18L. In this way, the negative control pressure, which is the pressure of the hydraulic oil in the hydraulic system (control valve unit 17), decreases as the amount of operation of the operating device 26 increases. As a result, the controller 30 increases the discharge flow rate of the left main pump 14L, circulates sufficient hydraulic oil to the operated hydraulic actuator, and ensures the driving of the operated hydraulic actuator. The controller 30 also controls the discharge flow rate of the right main pump 14R in the same manner.

With the above-described configuration, the hydraulic system of FIG. 2 can suppress wasteful energy consumption in the main pump 14 in the standby state. The wasteful energy consumption includes the pumping loss generated in the center bypass oil passage 40 by the hydraulic oil discharged from the main pump 14. Furthermore, in the hydraulic system of FIG. 2, when a hydraulic actuator is operated, the sufficient amount of hydraulic oil can be reliably supplied from the main pump 14 to the operated hydraulic actuator.

The dial 75 is configured to be able to adjust target rotation speed of the engine 11. Specifically, the dial 75 is configured to transmit information indicating a setting state of the target rotation speed of the engine 11 to the controller 30. In this embodiment, the dial 75 is configured to be able to change the target rotation speed in ten levels from a first level (level corresponding to the highest target rotation speed) to a tenth level (level corresponding to the lowest target rotation speed). The actual rotation speed of the engine 11 is controlled to be the target rotation speed selected by the dial 75.

The ECO button 76 is an example of an operation tool for switching ON and OFF of an ECO mode. The ECO mode is one of work modes of the shovel 100, and is a work mode in which a function for suppressing fuel consumption is executed. The work mode of the shovel 100 may include a crane mode used in crane work. In this embodiment, the work mode of the shovel 100 is configured to be switched between the ECO mode and a normal mode every time the ECO button 76 is pressed. The normal mode is one of the work modes of the shovel 100, and is a work mode in which a function for suppressing the fuel consumption is not executed. The function executed in the ECO mode includes, for example, a function of slowing the movement of the attachment. When the function of slowing the movement of the attachment is executed, the extension and retraction acceleration of each of the boom cylinder 7, the arm cylinder 8, and the bucket cylinder 9 when the operating lever is moved away from the neutral position is limited to equal to or less than a predetermined value. In this embodiment, the maximum extension and retraction speed is not limited, but the maximum extension and retraction speed may be limited. In this embodiment, the extension and retraction acceleration when the operating lever is returned to the neutral position is not limited, but the extension and retraction acceleration when the operating lever is returned to the neutral position may also be limited. This function is implemented by, for example, limiting stroke acceleration (the rate of increase in the pilot pressure) of the control valves 174 to 176. By using the ECO button 76, the operator of the shovel 100 can suppress the consumption of fuel as necessary. Therefore, the shovel 100 can support a situation, for example, in which the operator wishes to suppress the fuel consumption even by limiting the operability of the shovel 100.

An example of a function of the controller 30 for controlling the discharge flow rate of the main pump 14 (hereinafter referred to as "discharge flow rate control function") is described. In this embodiment, the controller 30 includes an energy saving control part 30A and a current command output part 30B. In FIG. 2, the energy saving control part 30A and the current command output part 30B are illustrated separately for the sake of simplicity, but they need not be physically distinct, and may include entirely or partially common software components, hardware components, or combinations thereof.

The energy saving control part 30A is configured to control the discharge flow rate of the main pump 14. Specifically, the energy saving control part 30A is configured to derive a command value Qn of the discharge flow rate based on control pressure Pn as the negative control pressure. The command value Qn is a value corresponding to the displacement. In this embodiment, the energy saving control part 30A acquires the control pressure Pn output from the control pressure sensor 19. The energy saving control part 30A then refers to a reference table to derive the command value Qn corresponding to the acquired control pressure Pn. The reference table is a reference table that holds the control pressure Pn and the command value Qn such that a correspondence relationship therebetween can be referable. The reference table is stored in advance in a nonvolatile storage unit. Note that the energy saving control part 30A may be configured to derive the command value Qn from the control pressure Pn by using a mathematical equation or the like without using the reference table.

The current command output part 30B is configured to output a current command to the pump regulator 13. In this embodiment, the current command output part 30B outputs the current command derived based on the command value Qn output from the energy saving control part 30A to the pump regulator 13.

In such a way, the controller 30 controls the discharge flow rate of the main pump 14. In the illustrated example, the controller 30 separately controls the discharge flow rate of the left main pump 14L and the discharge flow rate of the right main pump 14R. Specifically, the controller 30 derives a current command for the left pump regulator 13L based on the control pressure which is the hydraulic oil pressure in the left center bypass oil passage 40L detected by the left control pressure sensor 19L. The controller 30 then outputs the current command to the left pump regulator 13L to control the discharge flow rate of the left main pump 14L. The controller 30 also derives a current command for the right pump regulator 13R based on the control pressure which is the hydraulic oil pressure in the right center bypass oil passage 40R detected by the right control pressure sensor 19R. The controller 30 then outputs the current command to the right pump regulator 13R to control the discharge flow rate of the right main pump 14R.

Figure 3:
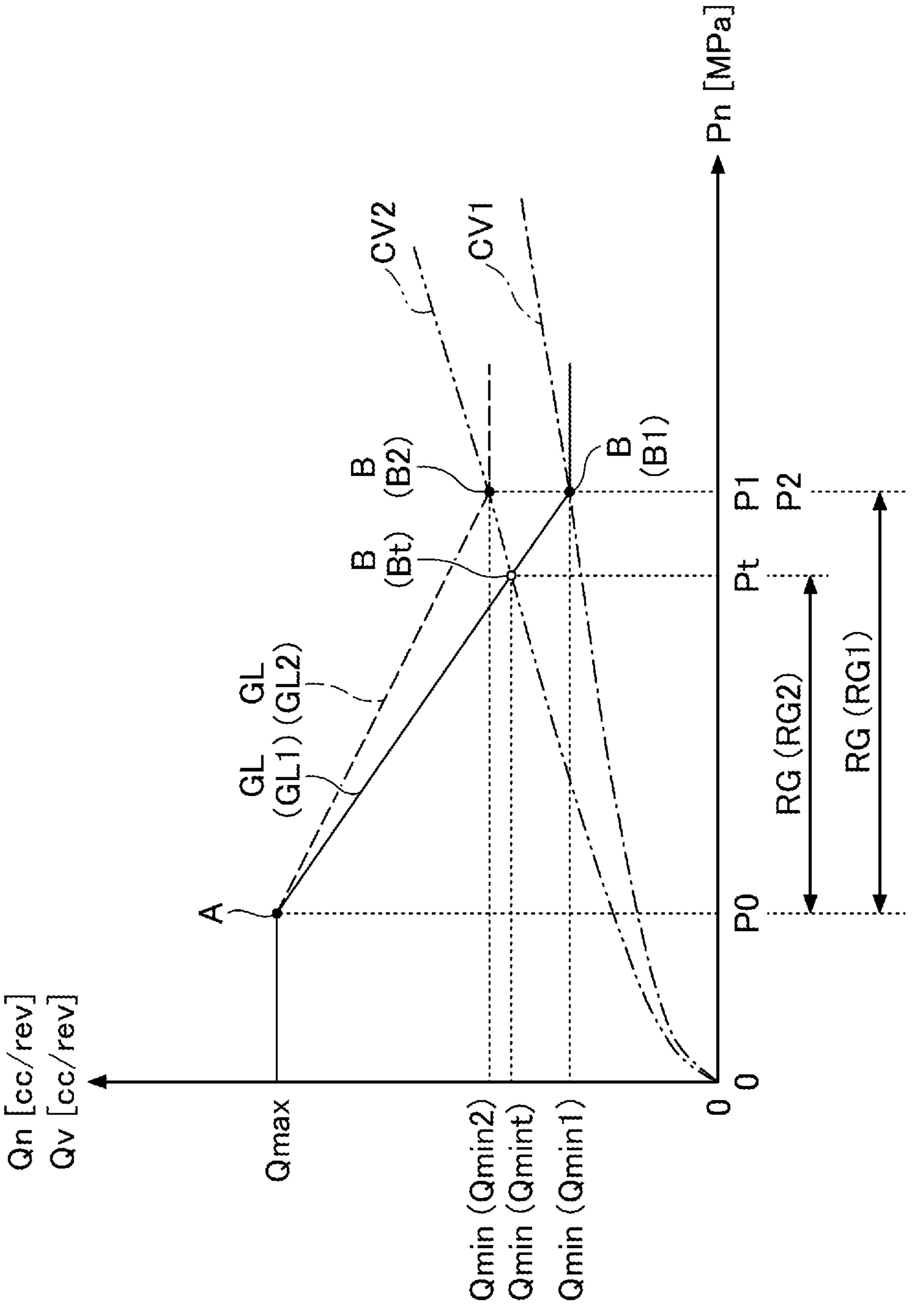
FIG. 3 is a graph illustrating an example of the contents of a reference table.

An example of the contents of the reference table referred to by the energy saving control part 30A will be described with reference to FIG. 3 and FIG. 4. FIG. 3 is a graph illustrating an example of the contents of the reference table, and illustrates the correspondence relationship between the control pressure Pn and the command value Qn. Specifically, in FIG. 3, the horizontal axis represents the control pressure Pn [MPa] detected by the control pressure sensor 19, and the vertical axis represents the command value Qn [cc/rev]. An amount control characteristic line GL, which is a line chart including an inclined line, indicates the relationship between the command value Qn and the control pressure Pn. The command value Qn [cc/rev] corresponds to a target displacement of the main pump 14. The controller 30 controls the pump regulator 13 by outputting the command value Qn to the pump regulator 13 so that an actual discharge amount Q [L/min] of the main pump 14 becomes a target discharge flow rate [L/min]. The target discharge flow rate [L/min] is a value calculated by multiplying the rotation speed of the engine 11 by the target displacement, for example. The contents of the reference table illustrated in FIG. 3 are used when controlling the respective discharge flow rates of the left main pump 14L and the right main pump 14R. In controlling the discharge flow rate of the left main pump 14L, the horizontal axis of FIG. 3 corresponds to the control pressure detected by the left control pressure sensor 19L, and the vertical axis of FIG. 3 corresponds to the command value of the discharge flow rate of the left main pump 14L. Similarly, in controlling the discharge flow rate of the right main pump 14R, the horizontal axis of FIG. 3 corresponds to the control pressure detected by the right control pressure sensor 19R, and the vertical axis of FIG. 3 corresponds to the command value of the discharge flow rate of the right main pump 14R.

More specifically, FIG. 3 illustrates the correspondence relationship between the control pressure Pn and the command value Qn when the engine 11 rotates at a first rotation speed N1 by a first amount control characteristic line GL1 of a solid line. FIG. 3 also illustrates the correspondence relationship between the control pressure Pn and the command value Qn when the engine 11 rotates at a second rotation speed N2 which is lower than the first rotation speed N1 by a second amount control characteristic line GL2 of a broken line. Note that the amount control characteristic line is set so as to be adjustable at a predetermined timing, unlike throttle characteristics illustrated in FIG. 4. Furthermore, the amount control characteristic line may be set in advance before being referred to, or may be dynamically set at the time of reference.

Figure 4:
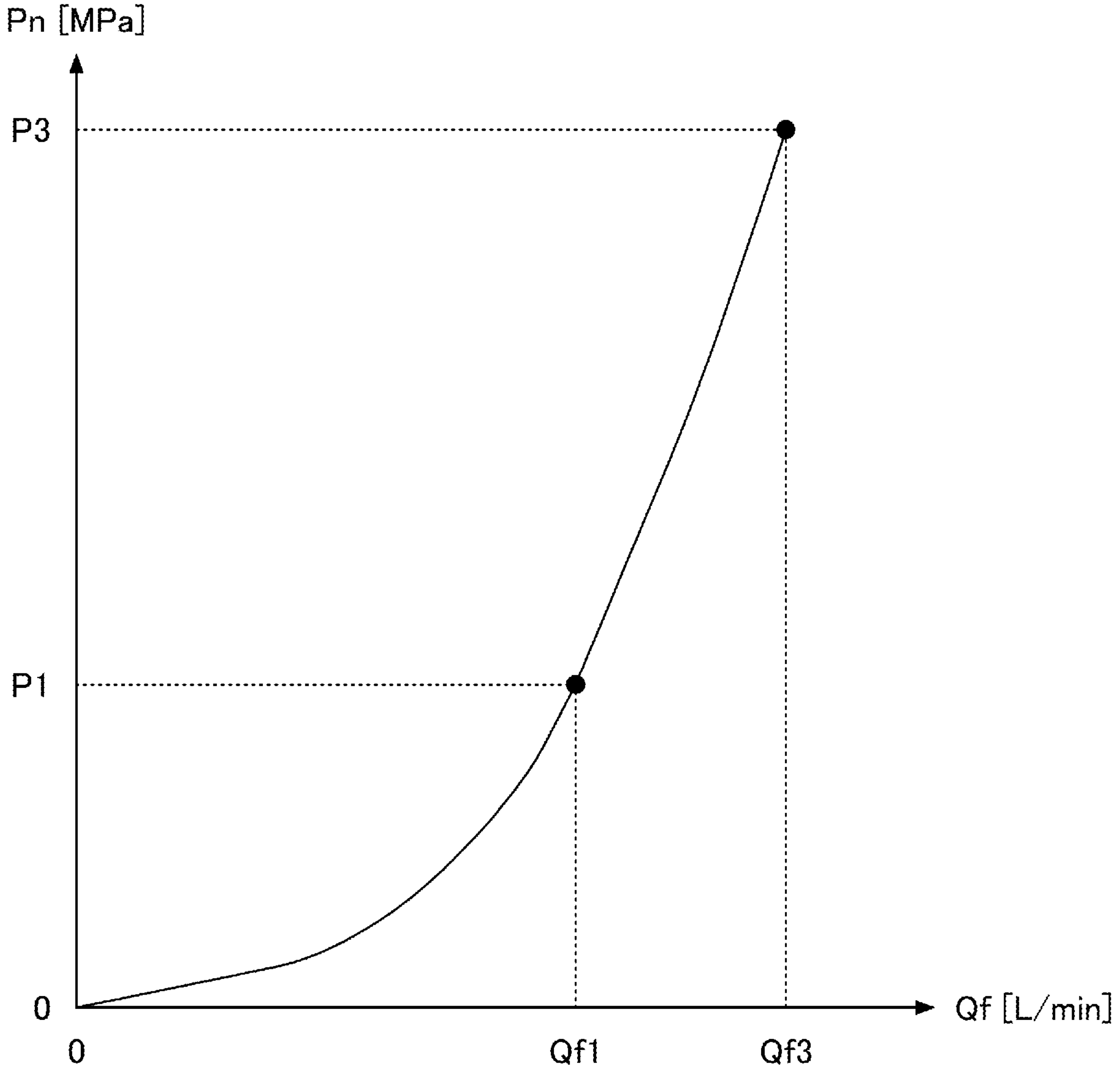
FIG. 4 is a graph illustrating an example of a characteristic of a throttle provided in a center bypass oil passage.

FIG. 4 is a diagram illustrating an example of throttle characteristics which are characteristics of the throttle 18 determined by a mechanical restriction such as a flow passage area of the throttle 18. Specifically, FIG. 4 illustrates an example of the throttle characteristics of the throttle 18 when the engine 11 rotates at the first rotation speed N1. The first rotation speed N1 is, for example, a rated rotation speed. In FIG. 4, the horizontal axis represents an amount Qf

[L/min] of the hydraulic oil passing through the throttle 18, and the vertical axis represents the control pressure Pn [MPa]. Note that the throttle characteristics of the throttle 18 illustrated in FIG. 4 are the throttle characteristics of the left throttle 18L and the right throttle 18R. In the standby state, the amount Qf of the hydraulic oil passing through the throttle 18 corresponds to the discharge flow rate of the main pump 14. The standby state is a state of the shovel 100 when the engine 11 is in operation and the operation device 26 is not operated. Specifically, in the standby state, the amount of the hydraulic oil passing through the left throttle 18L corresponds to the discharge flow rate of the left main pump 14L, and the amount of the hydraulic oil passing through the right throttle 18R corresponds to the discharge flow rate of the right main pump 14R.

Specifically, the throttle characteristic illustrated in FIG. 4 indicates that the control pressure Pn becomes a pressure value P1 when the amount Qf of the hydraulic oil passing through the throttle 18 is a value Qf1, and the control pressure Pn becomes a pressure value P3 when the amount Qf of the hydraulic oil passing through the throttle 18 is a value Qf3.

In this embodiment, the energy saving control part 30A is configured to derive the command value Qn corresponding to the control pressure Pn by using the amount control characteristic line GL passing through an upper end point A and a lower end point B as illustrated in FIG. 3.

The upper end point A is a point that defines the upper end of the inclined line included in the amount control characteristic line GL, and is an intersection point between a maximum command value Qmax and a pressure value P0. The maximum command value Qmax is the upper limit of the command value used in the negative control, and is, for example, a set value corresponding to a tilt angle of the swash plate smaller than the maximum tilt angle of the swash plate of the main pump 14 by a predetermined angle. In the example illustrated in FIG. 3, the maximum command value Qmax and the pressure value P0 are set independently of the rotation speed of the engine 11. However, the maximum command value Qmax and the pressure value P0 may be set to be different depending on the degree of the rotation speed of the engine 11.

The lower end point B is a point that defines the lower end of the inclined line included in the amount control characteristic line GL, and is an intersection point between a minimum command value Qmin and the pressure value P1. The minimum command value Qmin is the lower limit of the command value used in the negative control, and is, for example, a set value corresponding to a tilt angle of the swash plate larger than the minimum tilt angle of the swash plate of the main pump 14 by a predetermined angle. The tilt angle of the swash plate larger than the minimum tilt angle of the swash plate by a predetermined angle is, for example, a tilt angle of the swash plate corresponding to a standby amount. The standby amount is an amount of the hydraulic oil passing through the throttle 18, that is, an amount of the hydraulic oil discharged from the main pump 14 when the shovel 100 is in the standby state. In the example illustrated in FIG. 3, the minimum command value Qmin is set to be different depending on the magnitude of the rotation speed of the engine 11, and the pressure value P1 is set regardless of the magnitude of the rotation speed of the engine 11. However, the minimum command value Qmin may be set regardless of the magnitude of the rotation speed of the engine 11. In such a case, the pressure value P1 may be set to be different depending on the magnitude of the rotation speed of the engine 11. Alternatively, each of the pressure value P1 and the minimum command value Qmin may be set to be different depending on the magnitude of the rotation speed of the engine 11.

FIG. 3 also illustrates a throttle characteristic line CV (first throttle characteristic line CV1 represented by a one dot chain line) representing a relationship between the control pressure Pn and an amount Qv [cc/rev] of the hydraulic oil passing through the throttle 18 when the engine 11 is rotated at the first rotation speed N1 [rpm], and a throttle characteristic line CV (second throttle characteristic line CV2 represented by a two dot chain line) representing a relationship between the control pressure Pn and the amount Qv [cc/rev] of the hydraulic oil passing through the throttle 18 when the engine 11 is rotated at the second rotation speed N2 [rpm]. Note that, in the standby state, the amount Qv [cc/rev] of the hydraulic oil passing through the throttle 18 corresponds to the displacement of the main pump 14 achieved by the command value Qn [cc/rev].

Furthermore, a value [cc/min] obtained by multiplying the value of the amount Qv [cc/rev] corresponding to a point on the first throttle characteristic line CV1 illustrated in FIG. 3 by the first rotation speed [rpm] corresponds to the amount Qf [L/min] illustrated in FIG. 4. For example, a value, at a lower end point B1 illustrated in FIG. 3, obtained by multiplying a value Qmin1 of the minimum command value Qmin [cc/rev] when the control pressure Pn [Mpa] is the pressure value P1 by the first rotation number [rpm] corresponds to the value Qf1 of the amount Qf [L/min] illustrated in FIG. 4.

A rotary shaft of the main pump 14 is coupled to a rotary shaft of the engine 11 as a motor. Therefore, for example, in the standby state, when the rotation speed of the engine 11 rotating at a predetermined rotation speed decreases, the main pump 14 reduces the discharge flow rate (the flow rate of the hydraulic oil discharged by the main pump 14 per minute) even when the command value Qn (displacement) is not changed. In the example illustrated in FIG. 3, the decrease in the rotation speed of the engine 11 is achieved by the operator operating the dial 75. For example, when performing work with a low load such as leveling work, the operator may adopt a lower rotation speed of the engine 11 than the rotation speed adopted when performing work with a high load such as excavation work. In such a case, the operator reduces the rotation speed of the engine 11 using the dial 75. The control pressure Pn decreases as the discharge flow rate of the main pump 14 decreases. When the control pressure Pn is reduced, a balance point moves on the amount control characteristic line GL, and standby pressure is also reduced. Note that the balance point is a point on the amount control characteristic line GL when the fluctuations of the command value Qn (displacement) and the control pressure Pn converge, and corresponds to an intersection point between the amount control characteristic line GL and the throttle characteristic line CV. The standby pressure means a value of the control pressure Pn corresponding to the balance point in the standby state.

If the standby pressure decreases, the responsiveness of the start of the movement of the hydraulic actuator when the operation of the operation device 26 is started deteriorates, and the operability of the shovel 100 therefore deteriorates. A range RG of the control pressure Pn that can be controlled by the negative control is narrowed. Therefore, an amount control region for the lever input is narrowed, and the controllability of the discharge flow rate of the main pump 14 is deteriorated.

In the example illustrated in FIG. 3, when the rotation speed of the engine 11 rotating at the first rotation speed N1 in the standby state decreases to the second rotation speed N2, the main pump 14 reduces the discharge flow rate even when the command value Qn (displacement) is not changed. The control pressure Pn then decreases as the discharge flow rate of the main pump 14 decreases. This is because the amount of the hydraulic oil passing through the throttle 18 decreases. When the control pressure Pn decreases, the balance point, which is at the lower end point B1 when the rotation speed of the engine 11 is the first rotation speed N1, converges to a lower end point Bt while moving on the first amount control characteristic line GL1, and the standby pressure at the pressure value P1 also decreases to the pressure at a pressure value Pt. When the standby pressure is reduced to the pressure value Pt, the responsiveness of the start of movement of the hydraulic actuator when the operation of the operation device 26 is started is deteriorated, and the operability of the shovel 100 is deteriorated. The range RG of the control pressure Pn that can be controlled by the negative control is narrowed from a range RG1 (range between the pressure value P0 and the pressure value P1) when the rotation speed of the engine 11 is the first rotation speed N1 to a range RG2 (range between the pressure value P0 and the pressure value Pt). Therefore, the controllability of the discharge flow rate of the main pump 14 is deteriorated.

The controller 30 therefore executes the discharge flow rate control function to change an amount control characteristic of the main pump 14 in accordance with the change in the rotation speed of the engine 11, thereby suppressing or preventing deterioration in operability of the shovel 100 and deterioration in controllability of the discharge flow rate of the main pump 14 when the rotation speed of the engine 11 is changed.

In the example illustrated in FIG. 3, the energy saving control part 30A is configured to be able to adjust the correspondence relationship between the control pressure Pn and the command value Qn by changing the position of the lower end point B in the vertical axis direction, that is, by changing the minimum command value Qmin.

Specifically, the energy saving control part 30A adjusts the correspondence relationship between the control pressure Pn and the command value Qn to be suitable for the state of the shovel 100 at that time by making the position of the lower end point B different between when the rotation speed of the engine 11 is the first rotation speed N1 and when the rotation speed of the engine 11 is the second rotation speed N2. In the example illustrated in FIG. 3, for convenience of explanation, the energy saving control part 30A changes the position of the lower end point B in two steps, that is, when the rotation speed of the engine 11 is the first rotation speed N1 and when the rotation speed of the engine 11 is the second rotation speed N2. However, the energy saving control part 30A may be configured to be able to change the position of the lower end point B in equal to or more than three steps in accordance with the magnitude of the rotation speed of the engine 11, or change the position of the lower end point B steplessly in accordance with the magnitude of the rotation speed of the engine 11.

Specifically, the energy saving control part 30A is configured such that, when the rotation speed of the engine 11 is the first rotation speed N1, the amount control characteristic line GL becomes the first amount control characteristic line GL1 with the lower end point B being the lower end point B1 (at a point where the minimum command value Qmin is the value Qmin1) as illustrated by a solid line in FIG. 3.

The energy saving control part 30A is also configured such that, when the rotation speed of the engine 11 is the second rotation speed N2, the amount control characteristic line GL becomes the second amount control characteristic line GL2 with the lower end point B being a lower end point B2 (at a point where the minimum command value Qmin is a value Qmin2), as illustrated by the broken line in FIG. 3.

By displacing the position of the lower end point B upward in the vertical axis direction in response to a decrease in the rotation speed of the engine 11 in this way, the energy saving control part 30A can suppress or prevent a decrease in the control pressure Pn even when the rotation speed of the engine 11 decreases. Accordingly, the energy saving control part 30A can suppress or prevent a decrease in the standby pressure even when the rotation speed of the engine 11 decreases in the standby state of the shovel 100.

The state in which the standby pressure is low deteriorates the responsiveness of the start of movement of the hydraulic actuator when the operation of the operation device 26 is started, and thus causes the deterioration in the operability of the shovel 100. Furthermore, the state in which the standby pressure is low narrows the range RG of the control pressure Pn that can be controlled by the negative control, and therefore, the controllability of the discharge flow rate of the main pump 14 deteriorates.

The energy saving control part 30A can suppress or prevent such a problem from occurring by suppressing or preventing the standby pressure from being lowered. The energy saving control part 30A therefore can improve the operability of the shovel 100 and the controllability of the discharge flow rate of the main pump 14.

For example, in the standby state, when the operator reduces the rotation speed of the engine 11 from the first rotation speed N1 to the second rotation speed N2 using the dial 75, the amount of the hydraulic oil passing through the throttle 18 decreases. This is because the rotation speed of the rotary shaft of the main pump 14 connected to the rotary shaft of the engine 11 decreases with a decrease in the rotation speed of the engine 11. Note that, for example, when performing work with a low load such as leveling work, the operator may adopt a lower rotation speed of the engine 11 than the rotation speed adopted when performing work with a high load such as excavation work. In such a case, the operator reduces the rotation speed of the engine 11 using the dial 75.

When the hydraulic oil passing through the throttle 18 decreases, the control pressure Pn (standby pressure) also decreases, and thus the command value Qn increases along the amount control characteristic line GL as illustrated in FIG. 3. If the amount control characteristic line GL is fixed to the first amount control characteristic line GL1, the command value Qn becomes a value Qmint corresponding to a balance point (lower end point Bt) which is an intersection point between the second throttle characteristic line CV2 when the rotation speed of the engine 11 is the second rotation speed N2 and the first amount control characteristic line GL1. The standby pressure (control pressure Pn) is then reduced to the pressure value Pt corresponding to the balance point (lower end point Bt).

In a state where the rotation speed of the engine 11 decreases from the first rotation speed N1 to the second rotation speed N2, even when the operator quickly operates the operating lever to quickly move an excavating attachment, the operator cannot quickly move the excavating attachment as intended. This is because the standby pressure has been reduced. The same applies to a case where the swing hydraulic motor 2A or the traveling hydraulic motor 2M is to be moved quickly.

In contrast, when the second amount control characteristic line GL2 is adopted as the amount control characteristic line GL corresponding to the second rotation speed N2 by executing the discharge flow rate control function, the balance point which is the intersection point between the second amount control characteristic line GL2 and the second throttle characteristic line CV2 is the lower end point B2, and the standby pressure (control pressure Pn) is a pressure value P2 corresponding to the balance point (lower end point B2). This is because the command value Qn increases from the value Qmin1 to the value Qmin2, and the amount of the hydraulic oil passing through the throttle 18 increases. Note that, in the example illustrated in FIG. 3, the pressure value P1 and the pressure value P2 are the same.

Therefore, even when the rotation speed of the engine 11 decreases from the first rotation speed N1 to the second rotation speed N2, the standby pressure is maintained at the same value. As a result, the energy saving control part 30A can improve the operability of the shovel 100 compared to the case where the first amount control characteristic line GL1 is adopted as the amount control characteristic line GL. The energy saving control part 30A also can improve the controllability of the discharge flow rate of the main pump 14, compared to the case where the first amount control characteristic line GL1 is adopted as the amount control characteristic line GL. This is because the range RG of the control pressure Pn that can be controlled by the negative control is not narrowed.

In such a way, the controller 30 can flexibly control the standby pressure by changing the amount control characteristic of the negative control in accordance with the change in the rotation speed of the engine 11, that is, by displacing the lower end point B in the vertical axis direction. Specifically, the energy saving control part 30A adjusts the amount control characteristic line GL in accordance with the decrease in the rotation speed of the engine 11, and thereby, it is possible to suppress or prevent the deterioration in operability of the shovel 100 and the deterioration in controllability of the discharge flow rate of the main pump 14 due to the decrease in the standby pressure.

Figure 5:
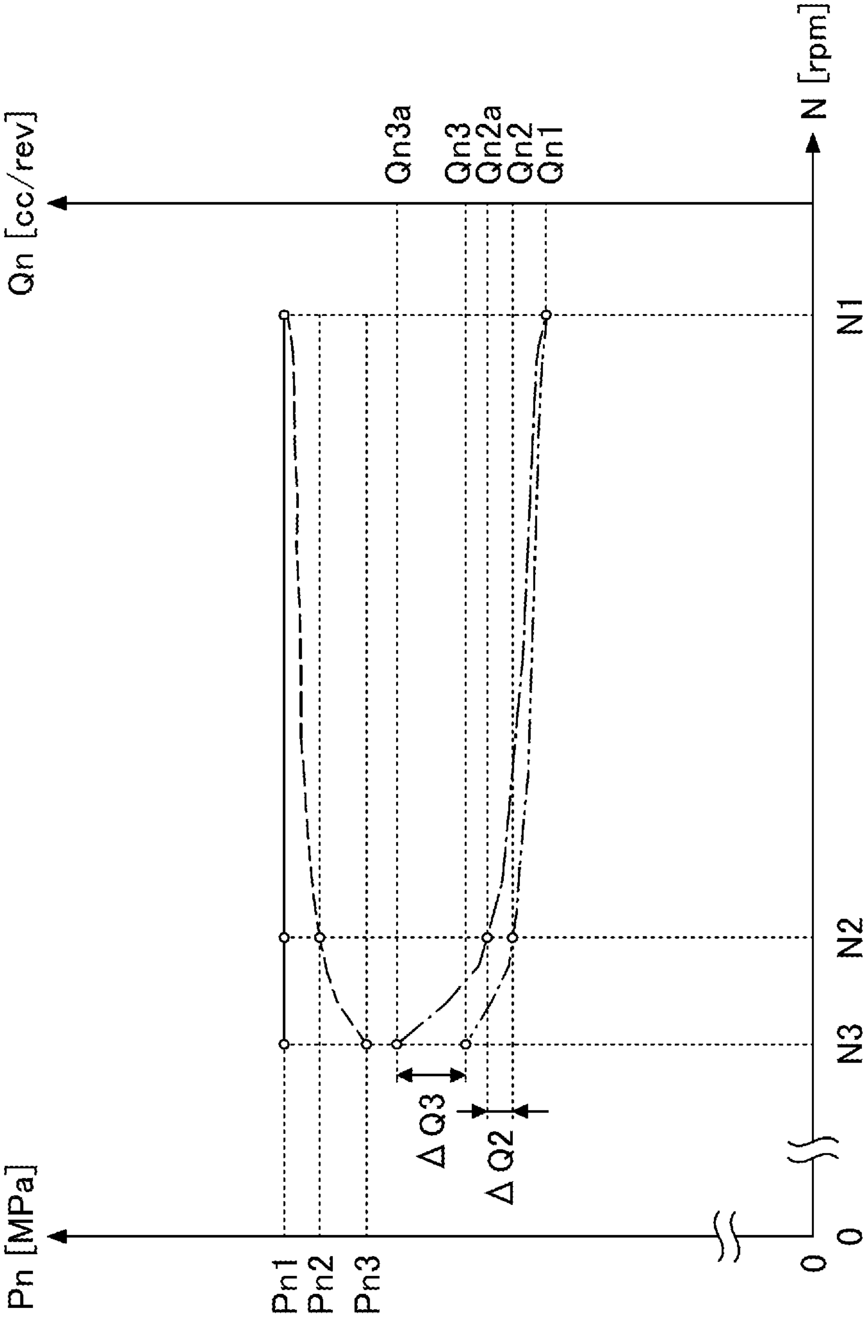
FIG. 5 is a graph illustrating an example of the relationship between the rotational speed of an engine, a control pressure, and a displacement.

The relationship between the rotation speed [rpm] of the engine 11 in the standby state and each of the control pressure Pn [MPa] and the command value Qn [cc/rev] will now be described with reference to FIG. 5. FIG. 5 is a diagram illustrating an example of the relationship between the rotation speed [rpm] of the engine 11 and each of the control pressure Pn [MPa] and the command value Qn [cc/rev].

Specifically, a solid line in FIG. 5 indicates the relationship between the rotation speed [rpm] of the engine 11 and the control pressure Pn [MPa] when the discharge flow rate control function is being executed. A broken line in FIG. 5 indicates the relationship between the rotation speed [rpm] of the engine 11 and the control pressure Pn [MPa] when the discharge flow rate control function is not being executed, that is, when a first amount control characteristic represented by the first amount control characteristic line GL1 is continuously adopted regardless of the change in the rotation speed [rpm] of the engine 11. A one dot chain line in FIG. 5 indicates the relationship between the rotation speed [rpm] of the engine 11 and the command value Qn [cc/rev] when the discharge flow rate control function is being executed. A two dot chain line in FIG. 5 indicates the relationship between the rotation speed [rpm] of the engine 11 and the command value Qn [cc/rev] when the discharge flow rate control function is not being executed, that is, when the first amount control characteristic represented by the first amount control characteristic line GL1 is continuously adopted regardless of the change in the rotation speed [rpm] of the engine 11.

More specifically, the command value Qn [cc/rev] is controlled to increase as the rotation speed [rpm] of the engine 11 decreases, regardless of whether the discharge flow rate control function is being executed. The command value Qn [cc/rev] when the discharge flow rate control function is being executed is controlled to be larger than that when the discharge flow rate control function is not being executed. The command value Qn [cc/rev] is controlled such that the difference between the command value Qn [cc/rev] when the discharge flow rate control function is being executed and the command value Qn [cc/rev] when the discharge flow rate control function is not being executed increases as the rotation speed [rpm] of the engine 11 decreases.

In the example illustrated in FIG. 5, the command value Qn [cc/rev] when the discharge flow rate control function is not being executed is a value Qn1 when the engine 11 rotates at the first rotation speed N1 [rpm], increases to a value Qn2 when the rotation speed of the engine 11 decreases to the second rotation speed N2 [rpm], and increases to a value Qn3 when the rotation speed of the engine 11 further decreases to a third rotation speed N3 [rpm]. In such a case, the control pressure Pn [MPa] as the standby pressure is a pressure value Pn1 when the engine 11 rotates at the first rotation speed N1 [rpm], decreases to a pressure value Pn2 when the rotation speed of the engine 11 decreases to the second rotation speed N2 [rpm], and decreases to a pressure value Pn3 when the rotation speed of the engine 11 further decreases to the third rotation speed N3 [rpm].

The command value Qn [cc/rev] when the discharge flow rate control function is being executed is the same value as the value Qn1 when the discharge flow rate control function is not being executed when the engine 11 rotates at the first rotation speed N1 [rpm], increases to a value Qn2$a$ when the rotation speed of the engine 11 decreases to the second rotation speed N2 [rpm], and increases to a value Qn3$a$ when the rotation speed of the engine 11 further decreases to the third rotation speed N3 [rpm]. The value Qn2$a$ is a value larger than the value Qn2 by ΔQ2, and the value Qn3$a$ is a value larger than the value Qn3 by ΔQ3. The ΔQ3 is larger than the ΔQ2.

In such a way, the controller 30 executes the discharge flow rate control function to increase the command value Qn [cc/rev] in accordance with a decrease in the rotation speed of the engine 11 along the one dot chain line illustrated in FIG. 5.

By this control, the control pressure Pn [MPa] as the standby pressure is maintained at the pressure value Pn1 even when the rotation speed of the engine 11 decreases from the first rotation speed N1 [rpm] to the second rotation speed N2 [rpm] and further decreases to the third rotation speed N3 [rpm].

As a result, the controller 30 can suppress or prevent the deterioration of operability of the shovel 100 and the deterioration of controllability of the discharge flow rate of the main pump 14 due to the decrease in the standby pressure.

Although the standby pressure is controlled to be constant at the pressure value Pn1 regardless of the decrease in the rotation speed of the engine 11 in the example illustrated in FIG. 5, the standby pressure may be controlled to be within a predetermined range. In such a case, the upper limit of the predetermined range may be the pressure value Pn1, may be a value larger than the pressure value Pn1, or may be a value smaller than the pressure value Pn1. The lower limit of the predetermined range may be the pressure value Pn1, may be a value larger than the pressure value Pn1, or may be a value smaller than the pressure value Pn1.

As described above, the shovel 100 according to the embodiment of the present disclosure includes the lower traveling body 1, the upper swing body 3 swingably mounted on the lower traveling body 1, the engine 11 as a motor mounted on the upper swing body 3, the main pump 14 as a hydraulic pump driven by the engine 11, and the controller 30 as a control device for controlling the discharge flow rate of the main pump 14 according to the preset amount control characteristic, as illustrated in FIG. 1 and FIG. 2. As illustrated in FIG. 3, the amount control characteristic is a characteristic indicating the correspondence relationship between the displacement (command value Qn [cc/reV]) of the main pump 14 and the negative control pressure (control pressure Pn [MPa]), and includes the first amount control characteristic represented by the first amount control characteristic line GL1 adopted when the engine 11 rotates at the first rotation speed N1 and a second amount control characteristic represented by the second amount control characteristic line GL2 adopted when the engine 11 rotates at the second rotation speed N2 which is lower than the first rotation speed N1.

This configuration provides an effect that the deterioration in operability of the shovel 100 can be suppressed even when the operation state of the motor is changed. For example, this configuration can maintain the negative control pressure (control pressure Pn [MPa]) by automatically increasing the displacement of the main pump 14 even when the rotation speed of the engine 11 decreases, and thus can suppress the deterioration in operability of the shovel 100. This configuration provides another effect that the controllability of the discharge flow rate of the main pump 14 can be suppressed from being deteriorated because the range RG of the control pressure Pn that can be controlled by the negative control is not limited. The operating state of the motor may be a state of the torque of the engine 11, the exhaust pressure of the engine 11, the rotation speed of the electric motor, the torque of the electric motor, the power consumption of the electric motor, or the like.

As illustrated in FIG. 3, the displacement of the main pump 14 may be controlled such that the negative control pressure (pressure value P1 of the control pressure Pn [MPa] as the standby pressure) when the engine 11 rotates at the first rotation speed N1 and the negative control pressure (pressure value P2 of the control pressure Pn [MPa] as the standby pressure) when the engine 11 rotates at the second rotation speed N2 are equal to each other in the standby state. Alternatively, the displacement of the main pump 14 may be controlled such that the standby pressure when the engine 11 rotates at the second rotation speed N2 is higher than the standby pressure when the engine 11 rotates at the first rotation speed N1. Note that the standby state is a state of the shovel 100 when the engine 11 is in operation and the operation device 26 is not operated.

This configuration can maintain the standby pressure by automatically increasing the displacement of the main pump 14 even when the rotation speed of the engine 11 decreases in the standby state, and thus can suppress the deterioration in operability of the shovel 100. This configuration provides another effect that, even in the standby state, the range RG of the control pressure Pn that can be controlled by the negative control is not narrowed, and thus, the controllability of the discharge flow rate of the main pump 14 in the standby state can be suppressed from being deteriorated.

The displacement of the main pump 14 when the engine 11 rotates at the second rotation speed N2 may be controlled to be larger than the displacement of the main pump 14 when the engine 11 rotates g at the first rotation speed N1. In the example illustrated in FIG. 3, in a state where the control pressure Pn [MPa] is the pressure value P1, the displacement of the main pump 14 when the engine 11 rotates at the first rotation speed N1 is controlled to be the value Qmin1, and the displacement of the main pump 14 when the engine 11 rotates at the second rotation speed N2 is controlled to be the value Qmin2 which is larger than the value Qmin1.

Furthermore, as illustrated in FIG. 3, the controller 30 may be configured to control the discharge flow rate of the main pump 14 in accordance with the second amount control characteristic represented by the second amount control characteristic line GL2 when the rotation speed of the engine 11 decreases to the second rotation speed N2.

This configuration can maintain the negative control pressure (control pressure Pn [MPa]) by automatically increasing the displacement of the main pump 14 even when the rotation speed of the engine 11 decreases to the second rotation speed N2, and thus can suppress the deterioration in operability of the shovel 100. In this configuration, even when the rotation speed of the engine 11 decreases to the second rotation speed N2, the range RG of the control pressure Pn that can be controlled by the negative control is not limited, and thus, the controllability of the discharge flow rate of the main pump 14 can be suppressed from being deteriorated.

The preferred embodiment of the present disclosure has been described above. However, the present disclosure is not limited to the above-described embodiment or an embodiment to be described below. Various modifications, substitutions, and the like can be applied to the above-described embodiment and the embodiment to be described below without departing from the scope of the present disclosure. Furthermore, the features described with reference to the above-described embodiment and the embodiment to be described below may be appropriately combined as long as there is no technical contradiction.

For example, in the above-described embodiment, the inclined line included in the amount control characteristic line GL is a straight line connecting the upper end point A and the lower end point B, but may be a line chart having two or more inflection points connecting the upper end point A and the lower end point B, a curve connecting the upper end point A and the lower end point B, or a combination of a straight line and a curve connecting the upper end point A and the lower end point B.

In the above-described embodiment, the energy saving control part 30A is configured to determine the inclined line included in the amount control characteristic line GL by determining the position of the upper end point A and the position of the lower end point B. However, the energy saving control part 30A may be configured to determine the inclined line included in the amount control characteristic line GL by determining one or two or more other points, or may be configured to determine (specify) the amount control characteristic line GL by determining the inclination angle of the inclined line included in the amount control characteristic line GL.

In the above-described embodiment, the energy saving control part 30A is configured to change the position of the lower end point B based on the information regarding the rotation speed of the engine 11 output from the dial 75.

However, the energy saving control part 30A may be configured to change the position of the lower end point B based on the rotation speed of the engine 11 detected by a rotation speed sensor (not illustrated).

In the above-described embodiment, the controller 30 is configured to execute the discharge flow rate control function when the rotation speed of the engine 11 changes in accordance with the selection by the operator using the dial 75. However, the controller 30 may be configured to execute the discharge flow rate control function when the rotation speed of the engine 11 changes, regardless of the selection by the operator. The controller 30 may also be configured not to execute the discharge flow rate control function when the work mode of the shovel 100 is switched to a power save mode and the rotation speed of the engine 11 is automatically reduced. The power save mode is a mode for suppressing consumption of fuel by the shovel 100. For example, when the controller 30 detects that the operation device 26 has not been operated for a predetermined period (for example, 30 seconds), the controller 30 switches the work mode of the shovel 100 to the power save mode. In the power save mode, for example, the displacement of the main pump 14 is set to a value stored in advance (typically, the smallest value among configurable values). Note that the controller 30 may be configured not to execute the discharge flow rate control function when the work mode of the shovel 100 is switched to the ECO mode.

In the above-described embodiment, the controller 30 is configured to separately control the discharge flow rate of the left main pump 14L and the discharge flow rate of the right main pump 14R by using the contents of the same reference table. However, the controller 30 may be configured to separately control the discharge flow rate of the left main pump 14L and the discharge flow rate of the right main pump 14R by using the contents of the different reference tables. For example, the controller 30 may be configured to be able to select the lower end point B for each of the main pumps 14.

Furthermore, in the above-described embodiment, as illustrated in FIG. 5, the controller 30 controls the command value Qn such that the control pressure Pn (standby pressure) when the engine 11 rotates at the first rotation speed N1 and the control pressure Pn (standby pressure) when the engine 11 rotates at the second rotation speed N2 have the same pressure value Pn1. However, the controller 30 may control the command value Qn such that the standby pressure when the engine rotates at the second rotation speed N2 (standby pressure when the low rotation speed is applied) is higher than the standby pressure when the engine rotates at the first rotation speed N1 (standby pressure when the high rotation speed is applied). This is because, in the case of the low rotation speed, even if the standby pressure when the low rotation speed is applied and the standby pressure when the high rotation speed is applied have the same pressure value, the responsiveness of the start of the movement of the hydraulic actuator is not as good as that when the high rotation speed is applied. Accordingly, the controller 30 can improve the responsiveness of the start of movement of the hydraulic actuator by increasing the standby pressure by increasing the command value Qn.

The above-described shovel can suppress deterioration of operability of a shovel even when an operation state of a motor changes.

What is claimed is:

1. A shovel comprising:
a lower traveling body;
an upper swing body swingably mounted on the lower traveling body;
a motor mounted on the upper swing body;
a hydraulic pump driven by the motor; and
processing circuitry configured to control a discharge flow rate of the hydraulic pump in accordance with a flow rate control characteristic that is preset,
wherein the flow rate control characteristic is a characteristic indicating a correspondence between a displacement of the hydraulic pump and a negative control pressure, and includes a first flow rate control characteristic adopted when the motor rotates at a first rotational speed and a second flow rate control characteristic adopted when the motor rotates at a second rotational speed lower than the first rotational speed,
the displacement of the hydraulic pump when the motor rotates at the second rotational speed is larger than the displacement of the hydraulic pump when the motor rotates at the first rotational speed.

2. The shovel according to claim 1, wherein, in a standby state, a standby pressure when the motor rotates at the second rotational speed is equal to or higher than a standby pressure when the motor rotates at the first rotational speed.

3. The shovel according to claim 2, wherein the standby state is a state of the shovel when the motor is in operation and an operating device is not operated.

4. The shovel according to claim 1, wherein
the negative control pressure is a pressure downstream of a directional control valve, and
the negative control pressure decreases as an amount of operation of an operating device increases.

5. The shovel according to claim 1, wherein
the hydraulic pump is configured to circulate hydraulic oil to a hydraulic oil tank via a center bypass oil passage passing through a plurality of directional control valves, and
the negative control pressure is a hydraulic oil pressure upstream of a throttle disposed between a furthest downstream directional control valve disposed in the center bypass oil passage and the hydraulic oil tank.

6. The shovel according to claim 5, wherein the throttle is a fixed throttle.

7. The shovel according to claim 1, further comprising:
a control pressure sensor configured to detect the negative control pressure,
wherein the processing circuitry is configured to control the discharge flow rate of the hydraulic pump in accordance with an output of the control pressure sensor.

8. The shovel according to claim 1, wherein the processing circuitry is configured to change the displacement of the hydraulic pump such that the negative control pressure is constant even when a rotational speed of the motor changes in a standby state.

9. The shovel according to claim 1, wherein the processing circuitry is configured to increase the displacement of the hydraulic pump such that the negative control pressure is constant even when the rotation speed of the motor decreases in a standby state.

10. The shovel according to claim 1, wherein the flow rate control characteristic is set for each of rotational speeds of the motor in a stepwise manner.

11. The shovel according to claim 1, wherein a fluctuation range of the negative control pressure when the motor rotates at the first rotational speed is same as a fluctuation range of the negative control pressure when the motor rotates at the second rotational speed.

12. A shovel comprising:

a lower traveling body;

an upper swing body swingably mounted on the lower traveling body;

a motor mounted on the upper swing body;

a hydraulic pump driven by the motor; and processing circuitry configured to control a discharge flow rate of the hydraulic pump in accordance with a flow rate control characteristic that is preset, wherein the flow rate control characteristic is a characteristic indicating a correspondence between a displacement of the hydraulic pump and a negative control pressure, and includes a first flow rate control characteristic adopted when the motor rotates at a first rotational speed and a second flow rate control characteristic adopted when the motor rotates at a second rotational speed lower than the first rotational speed, and wherein the processing circuitry is configured to control the discharge flow rate of the hydraulic pump in accordance with the second flow rate control characteristic when a rotational speed of the motor decreases to the second rotational speed.

13. A shovel comprising:

a lower traveling body;

an upper swing body swingably mounted on the lower traveling body;

a motor mounted on the upper swing body, wherein a negative control pressure in a standby state when the motor rotates at a second rotational speed lower than a first rotational speed is equal to or higher than the negative control pressure in the standby state when the motor rotates at the first rotational speed, the standby state being a state of the shovel when the motor is in operation and an operating device for operating a hydraulic actuator is not operated.

14. The shovel according to claim 13, further comprising:

a hydraulic pump configured to be driven by the motor to circulate hydraulic oil to a hydraulic oil tank via a center bypass oil passage passing through a plurality of directional control valves when the operating device is not operated, and supply the hydraulic oil to the hydraulic actuator when the operating device is operated, wherein the negative control pressure in the standby state is a hydraulic oil pressure upstream of a throttle when the motor is in operation and the operating device is not operated, the throttle being disposed between a furthest downstream directional control valve disposed in the center bypass oil passage and the hydraulic oil tank.

* * * * *